(12) United States Patent
Sedouram et al.

(10) Patent No.: US 12,687,936 B2
(45) Date of Patent: Jul. 21, 2026

(54) CONVERSATIONAL USER INTERFACES WITH MULTIMODAL INPUTS AND MIND MAP LIKE INTERACTIONS

(71) Applicant: Google LLC, Mountain View, CA (US)

(72) Inventors: Ramprasad Sedouram, Bangalore (IN); Jaunani Sriramachandran, Sammamish, WA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 18/454,054

(22) Filed: Aug. 22, 2023

(65) Prior Publication Data

US 2025/0068258 A1 Feb. 27, 2025

(51) Int. Cl.
*G06F 3/048* (2013.01)
*G06F 3/023* (2006.01)
*G06F 3/0482* (2013.01)
*H04L 51/02* (2022.01)

(52) U.S. Cl.
CPC .......... *G06F 3/0236* (2013.01); *G06F 3/0482* (2013.01); *H04L 51/02* (2013.01)

(58) Field of Classification Search
None
See application file for complete search history.

(56) References Cited

U.S. PATENT DOCUMENTS 10,484,313 B1 * 11/2019 Sutherland et al.
2020/0356237 A1 11/2020 Moran et al.

OTHER PUBLICATIONS

Find Easy Solution: "How to Edit ChatGPT prompt and rename Chat Title", Jul. 24, 2023 (Jul. 24, 2023), XP093216053.
International Search Report and Written Opinion issued in related PCT Application No. PCT/US2024/043325, dated Oct. 25, 2024.

* cited by examiner

*Primary Examiner* — Brian M Butcher
(74) *Attorney, Agent, or Firm* — Honigman LLP; Brett A. Krueger; Grant Griffith

(57) ABSTRACT

A method executed on data processing hardware and including displaying, on a display in communication with the data processing hardware, a user interface for a chat session between a user and a chatbot, the user interface including a plurality of entries input by the user and a plurality of corresponding responses from the chatbot. The method also includes receiving, in the user interface, a user input indication indicating selection of a particular entry of the plurality of entries, the particular entry being other than a last entry of the plurality of entries. The method further includes receiving, in the user interface, a new entry input by the user for an additional entry associated with the particular entry. The method additionally includes based on the additional entry associated with the particular entry, causing the chatbot to update one or more of the plurality of corresponding responses from the chatbot.

20 Claims, 6 Drawing Sheets

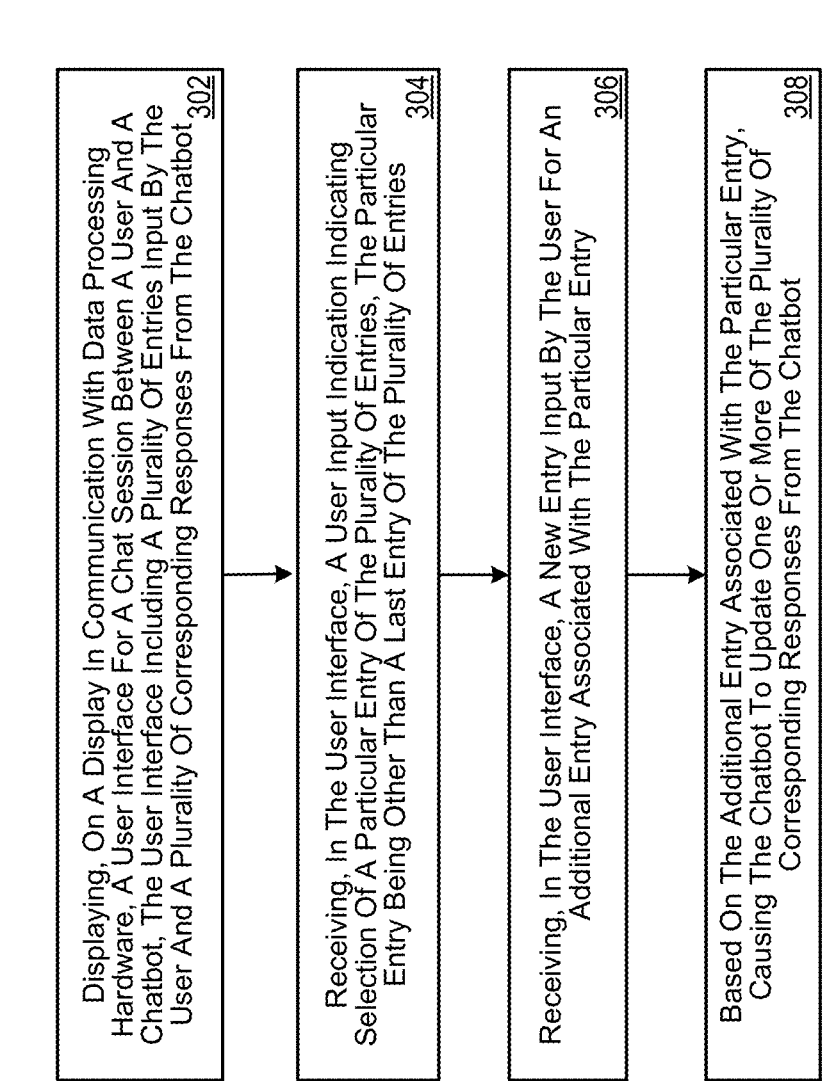

300

Displaying, On A Display In Communication With Data Processing Hardware, A User Interface For A Chat Session Between A User And A Chatbot, The User Interface Including A Plurality Of Entries Input By The User And A Plurality Of Corresponding Responses From The Chatbot 302

Receiving, In The User Interface, A User Input Indication Indicating Selection Of A Particular Entry Of The Plurality Of Entries, The Particular Entry Being Other Than A Last Entry Of The Plurality Of Entries 304

Receiving, In The User Interface, A New Entry Input By The User For An Additional Entry Associated With The Particular Entry 306

Based On The Additional Entry Associated With The Particular Entry, Causing The Chatbot To Update One Or More Of The Plurality Of Corresponding Responses From The Chatbot 308

FIG. 3

CONVERSATIONAL USER INTERFACES WITH MULTIMODAL INPUTS AND MIND MAP LIKE INTERACTIONS

TECHNICAL FIELD

This disclosure relates to conversational user interfaces and chatbots.

BACKGROUND

Increasingly, users are utilizing conversational user interfaces to, for example, obtain information. A conversational user interface represents a chat session between a user and a chatbot, such as Google Bard and ChatGBT. A conventional chat session represents a linear interaction between a user and chatbot in which the user provides entries one at a time and the chatbot provides, in turn, a response to each entry. Moreover, conventional chat sessions are limited to one input modality (e.g., speech or text) at a time.

SUMMARY

One aspect of the disclosure provides a computer-implemented method for providing a conversational user interface with multimodal inputs and mind map like interactions. The computer-implemented method, when executed on data processing hardware, causes the data processing hardware to perform operations including displaying, on a display in communication with the data processing hardware, a user interface for a chat session between a user and a chatbot, the user interface including a plurality of entries input by the user and a plurality of corresponding responses from the chatbot. The operations include receiving, in the user interface, a user input indication indicating selection of a particular entry of the plurality of entries, the particular entry being other than a last entry of the plurality of entries. The operations also include receiving, in the user interface, a new entry input by the user for an additional entry associated with the particular entry. The operations further include based on the additional entry associated with the particular entry, causing the chatbot to update one or more of the plurality of corresponding responses from the chatbot.

Implementations of the disclosure may include one or more of the following optional features. In some implementations, the one or more of the plurality of corresponding responses updated by the chatbot includes at least one corresponding response other than a last response of the plurality of corresponding responses. In some examples, receiving the new entry input by the user for the additional entry associated with the particular entry results in a non-linear chat session. Additionally or alternatively, receiving the new entry input by the user for the additional entry associated with the particular entry results in an unstructured chat session. Additionally or alternatively, receiving the new entry input by the user for the additional entry associated with the particular entry results in a mind map including an unstructured collection of interconnected ideas. Additionally or alternatively, receiving the new entry input by the user for the additional entry associated with the particular entry associates the additional entry with the particular entry in a hierarchical association of ideas. In some implementations, the operations further include displaying, on the display, a collapsed representation of the particular entry and the new entry.

In some examples, the particular entry of the plurality of entries was input by the user using a first input modality, and the new entry input by the user for the additional entry is input by the user using a first input modality, and the new entry input by the user for the additional entry is input by the user using a second input modality different than the first input modality. Here, the first input modality may include text, and the second input modality may include speech.

In some examples, the operations also include receiving, in the user interface, from a second user associated with the chat session, another user input indication indicating selection of another particular entry of the plurality of entries, the another particular entry being other than the last entry of the plurality of entries. Here, the operations also include receiving, in the user interface, a second new entry input by the second user for another additional entry to be associated with the another particular entry. Here, the operations also include associating the second new entry with the another particular entry in the chat session. Here, the operations also include, based on the another additional entry associated with the another particular entry, causing the chatbot to update one or more of the plurality of corresponding responses from the chatbot.

Another aspect of the disclosure provides a system including data processing hardware, and memory hardware in communication with the data processing hardware and storing instructions that, when executed on the data processing hardware, causes the data processing hardware to perform operations. The operations including displaying, on a display in communication with the data processing hardware, a user interface for a chat session between a user and a chatbot, the user interface including a plurality of entries input by the user and a plurality of corresponding responses from the chatbot. The operations include receiving, in the user interface, a user input indication indicating selection of a particular entry of the plurality of entries, the particular entry being other than a last entry of the plurality of entries. The operations also include receiving, in the user interface, a new entry input by the user for an additional entry associated with the particular entry. The operations further include based on the additional entry associated with the particular entry, causing the chatbot to update one or more of the plurality of corresponding responses from the chatbot.

Implementations of the disclosure may include one or more of the following optional features. In some implementations, the one or more of the plurality of corresponding responses updated by the chatbot includes at least one corresponding response other than a last response of the plurality of corresponding responses. In some examples, receiving the new entry input by the user for the additional entry associated with the particular entry results in a non-linear chat session. Additionally or alternatively, receiving the new entry input by the user for the additional entry associated with the particular entry results in an unstructured chat session. Additionally or alternatively, receiving the new entry input by the user for the additional entry associated with the particular entry results in a mind map including an unstructured collection of interconnected ideas. Additionally or alternatively, receiving the new entry input by the user for the additional entry associated with the particular entry associates the additional entry with the particular entry in a hierarchical association of ideas. In some implementations, the operations further include displaying, on the display, a collapsed representation of the particular entry and the new entry.

In some examples, the particular entry of the plurality of entries was input by the user using a first input modality, and the new entry input by the user for the additional entry is input by the user using a second input modality different than the first input modality. Here, the first input modality may include text, and the second input modality may include speech.

In some examples, the operations also include receiving, in the user interface, from a second user associated with the chat session, another user input indication indicating selection of another particular entry of the plurality of entries, the another particular entry being other than the last entry of the plurality of entries. Here, the operations also include receiving, in the user interface, a second new entry input by the second user for another additional entry to be associated with the another particular entry. Here, the operations also include associating the second new entry with the another particular entry in the chat session. Here, the operations also include, based on the another additional entry associated with the another particular entry, causing the chatbot to update one or more of the plurality of corresponding responses from the chatbot.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a flowchart of an example arrangement of operations for a computer-implemented method of providing conversational user interfaces with multimodal and mind map like interactions.

Like reference symbols in the various drawings indicate like elements.

DETAILED DESCRIPTION

Figure 1:
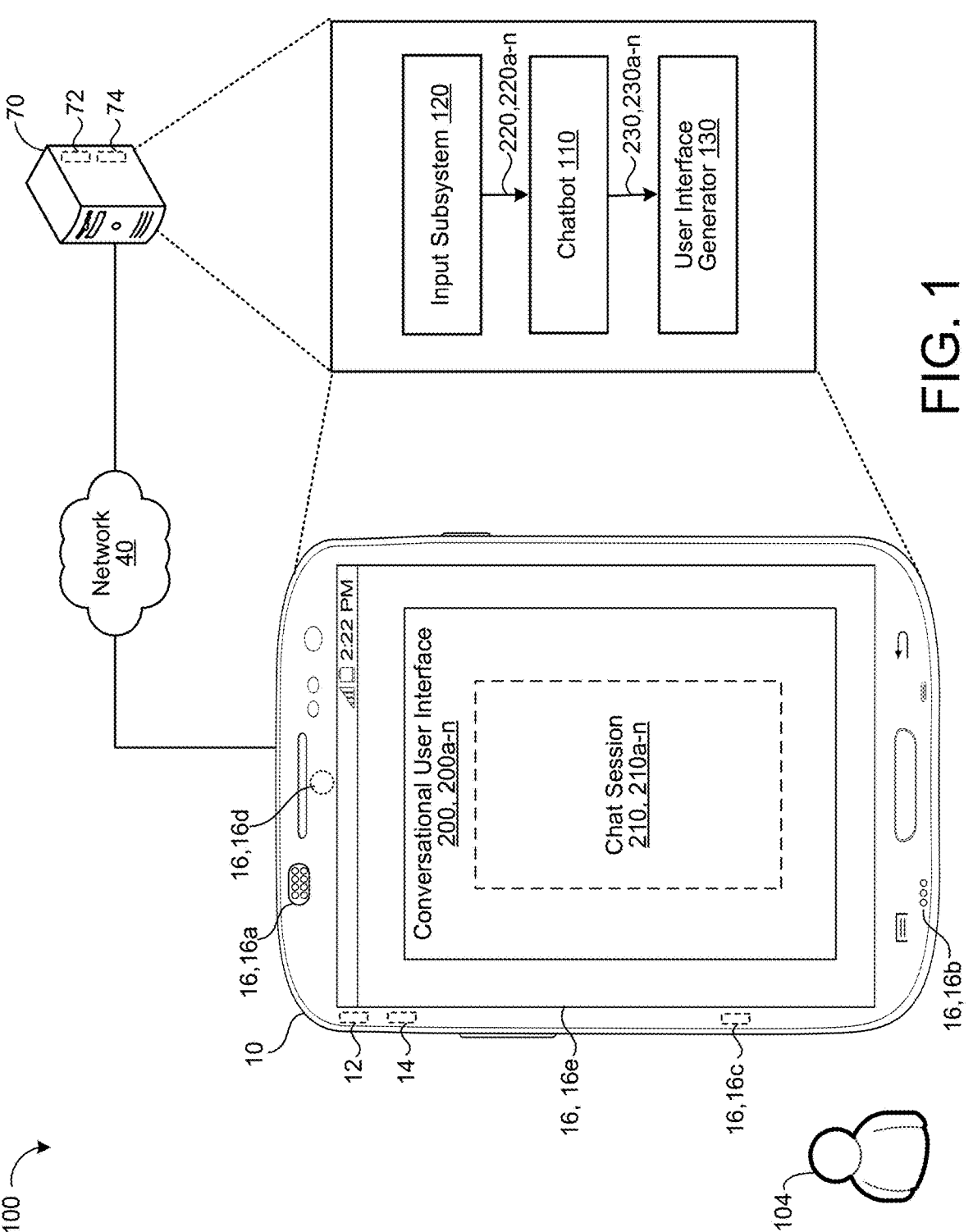
FIG. 1 is a schematic view of an example system using a chatbot for providing conversational user interfaces with multimodal inputs and mind map like interactions.

Increasingly, users are utilizing conversational user interfaces to, for example, obtain information. A conversational user interface represents a chat session between a user and a chatbot implemented by a large language model (LLM), such as Google Bard and ChatGBT. A conventional chat session represents a linear interaction between a user and chatbot in which the user provides entries one at a time and the chatbot provides, in turn, a response to each entry. Moreover, conventional chat sessions are limited to one input modality (e.g., speech or text) at a time. However, when dealing with complex topics, when brainstorming, etc., linear and single modal interactions may hamper a user's ability to obtain desired information. For example, sometime after inputting a first entry (e.g., possibly after a plurality of subsequent entries), a user may realize they want to expand, clarify, extend, modify, etc. the first entry. Such further thoughts may include new ideas, ideas that were in the back of their mind, ideas that they may have initially forgotten, ideas they were unsure of, etc. Today, the user has to copy, paste, and modify the first entry and then submit the modified entry as a standalone new entry. However, the creation of such a new entry may be time consuming, and it may seem unnatural because the user has to capture and organize all their subsequent thoughts to create the second entry. In stark contrast, in human-to-human interactions, a person may simply provide further thoughts as they arise, and the other person may mentally compile them together before responding. Moreover, in human-to-human interactions, a person may use different modalities for providing their thoughts. For example, they may provide text, spoken utterances, sounds, non-verbal cues, gestures, etc.

While chatbots can provide valuable insights and assistance, it is important to recognize and navigate the limitations of conventional chatbots. For example, because linear interactions may lack contextual understanding beyond a particular entry, it may be hard for a chatbot to accurately grasp the entirety of complex questions or discussions conveyed in a sequence of entries. As a result, attempting to have multi-faceted conversational interactions may be hard, as a chatbot might fail to retain crucial information from previous entries. In particular, artificial intelligence (AI) large language models used today by a chatbot focus primarily on the most recent entry, making it challenging for a chatbot to establish and maintain non-hierarchical information. As a consequence, a conversational interaction with a conventional chatbot can become fragmented, disjointed, and difficult to follow. For example, brainstorming often involves exploring various possibilities, iterating on ideas, and refining concepts. Delving deep into a single linear line of thought may result in a shallower exploration of complex topics. This may lead the chatbot to provide surface-level responses, hindering the ability of the chatbot to engage in detailed discussions or truly innovative brainstorming sessions. Moreover, when encountering complex ideas, a human often asks for clarification, poses follow-up questions, and/or revisits previously discussed topics to deepen their understanding. However, conventional AI models and chatbots may only respond based on the immediate context (i.e., most recent entry), and may lack the ability to proactively seek clarification or engage in deeper analysis. These limitations may inhibit the dynamic nature of conversations and hamper the exploration of intricate concepts using a chatbot.

Therefore, for at least these reasons, there is a need for providing chatbots and conversational user interfaces with multimodal inputs and mind map like interactions. Disclosed implementations include displaying a user interface representing a chat session between a user and a chatbot that enables the user to select a particular previous entry of a plurality of entries displayed in the user interface, receiving a new entry input by the user for an additional entry to be associated with the selected particular previous entry and, based on the additional entry, updating one or more of a plurality of previous responses from the chatbot displayed in the user interface.

FIG. 1 is a schematic view of an example of a system 100 using a chatbot 110 for providing conversational user interfaces 200, 200a-n for chat sessions that include multimodal inputs and mind map like interactions between a user 104 and the chatbot 110. Here, the chatbot 110 may include any number and/or type(s) of models, methods, algorithms, systems, software, hardware, instructions, etc. configured to mimic human-like conversations and/or interactions with a user 104 that include multimodal inputs and mind map like interactions. The user's 104 manner of interacting with a computing device, such as a user device 10, may be through any number and/or type(s) of inputs. Example inputs include, but are not limited to, text (e.g., entered using a physical or virtual keyboard), spoken utterances, video (e.g., representing gestures or expressions), and clicks (e.g., using a mouse or touch inputs). The user device 10 (also referred to generally as a device 10) is configured to capture inputs from the user 104. Here, a captured input may represent an entry 220, 220*a-n* input by the user 104 in a conversational user interface 200 for a chat session 210, 210*a-n* representing a virtual conversational-like interaction between the user 104 and the chatbot 110.

The user device 10 may correspond to any computing device associated with a user 104 and capable of capturing user inputs (e.g., user entries for a chat session). Some examples of user devices 10 include, but are not limited to, mobile devices (e.g., mobile phones, tablets, laptops, etc.), computers, wearable devices (e.g., smart watches), smart appliances, Internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes one or more input/output devices 16, 16*a-n*, such as an audio capture device 16, 16*a* (e.g., microphone) for capturing and converting spoken utterances 106 into electrical signals, an audio output device 16, 16*b* (e.g., a speaker) for communicating an audible audio signal (e.g., as output audio data from the user device 10), a virtual or physical keyboard 16, 16*c* for capturing textual inputs, a camera 16, 16*d* for capturing images or video, a display 16, 16*e* for displaying and, in some examples, receiving touch inputs, a mouse or other navigation device (not shown for clarity of illustration) for capturing selections, an automatic speech recognition (ASR) system (not shown for clarity of illustration), and/or a text-to-speech (TTS) system (not shown for clarity of illustration). Of course, any number and/or type(s) of other input/output devices may be used. The input/output devices 16 may reside on or be in communication with the user device 10.

The user device 10 and/or a remote computing device 70 (e.g., one or more remote servers of a distributed system executing in a cloud-computing environment) in communication with the user device 10 via a network 40 executes an input subsystem 120 configured to receive inputs captured by the input/output devices 16 and convert those inputs into a corresponding digital format representing chat session entries 220 capable of being processed and responded to by the chatbot 110. The remote computing device 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The chatbot 110 may reside on the user device 10 of the user 104 and/or on the remote computing device 70. The chatbot 110 is configured to receive entries 220, 220*a-n* (see FIGS. 2A-2E) input by the user 104 and captured by the input subsystem 120. The chatbot 110 processes the entries 220 input by the user 104 to determine corresponding responses 230, 230*a-n* (see FIGS. 2A-2E) from the chatbot 110. The user device 10 and/or the remote computing device 70 also executes a user interface generator 130 configured to provide, for output on an output device of the user device 10 (e.g., on the audio output device(s) 16*b* or the display 16*c*), the entries 220 input by the user 104 and the responses 230 from the chatbot 110 to the user 104. Here, the user interface generator 130 displays the entries 220 and the corresponding responses 230 in a user interface 200 for a chat session 210 between the user 104 and the chatbot 110. In the illustrated example, a chat session 210 is between the user 104 and the chatbot 110. However, a chat session 210 may also be a multi-party chat session including interactions amongst multiple users 104 and the chatbot 110.

Figure 2A:
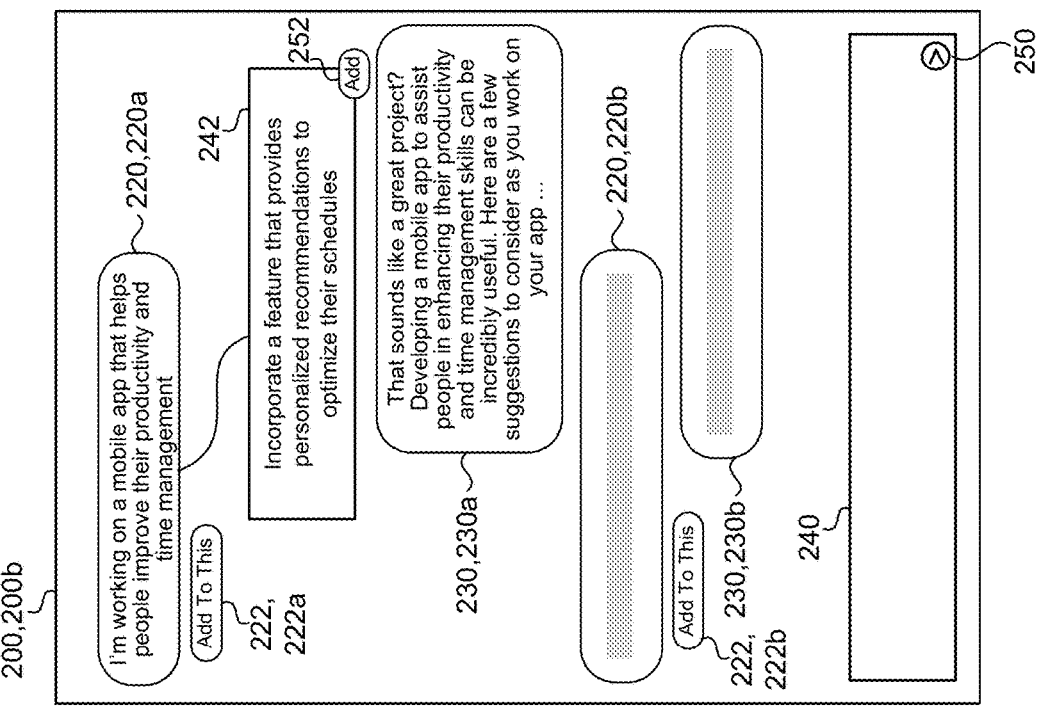
FIGS. 2A-2E illustrate example conversational user interfaces with multimodal and mind map like interactions.

FIG. 2A illustrates an example user interface 200, 200*a* displaying a portion of a chat session 210 between the user 104 and the chatbot 110. In this example, the user interface 200*a* includes a plurality of entries 220, 220*a-n* sequentially input by the user 104, and a plurality of corresponding responses 230, 230*a-n* from the chatbot 110. The user interface 200 also includes a text entry box 240 that the user 104 may use to input a new entry 220, and a button 250 for submitting the new entry to the chatbot 110. The user interface 200*a* includes a corresponding "add to this" button 222, 222*a-n* for each entry 220. The user 104 may provide a user input indication (e.g., click on using a mouse or touch input) directed toward the particular button 222 to select the corresponding entry 220 to which the user 104 wants to add additional input. Through use of the buttons 222, the chat session 210 is no longer constrained to be a linear interaction, as the user 104 may go back and add additional input, possibly in an ad hoc fashion.

Figure 2B:
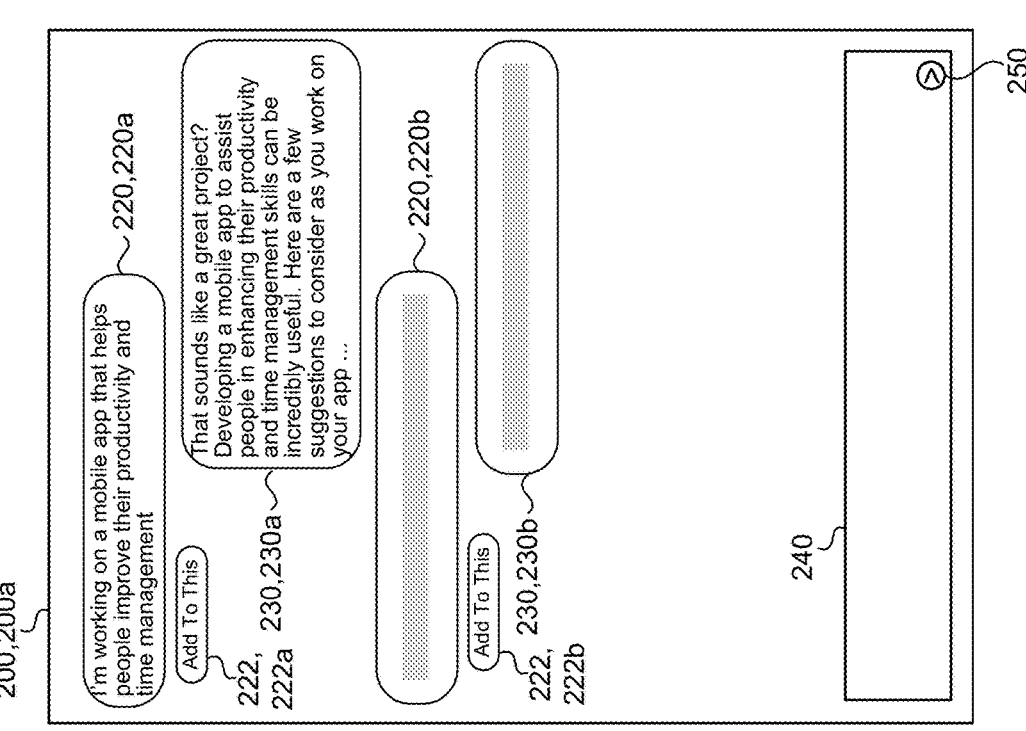

FIG. 2B illustrates another example user interface 200, 200*b* displaying a portion of the chat session 210 between the user 104 and the chatbot 110 that may be presented after the chatbot 110 receives, in the user interface 200*a*, a user input indication indicating selection of a particular entry 220*b* of the plurality of entries 220. In the illustrated example, the user input indication indicating selection of the particular entry 220*a* is received when the user 104 selects the "add to this" button 222*a*. In response to the user input indication, the chatbot 110 causes the user interface 200*b* to display a text entry box 240 that the user 104 may use to input additional input for a new entry 220, 220*c* (see FIG. 2C) related to the entry 220*a*, and a button 252 for causing the chatbot 110 to link the new entry 220*c* to the entry 220*a* and process the linked entries 220*a* and 220*c*.

Figures 2C, 2D:
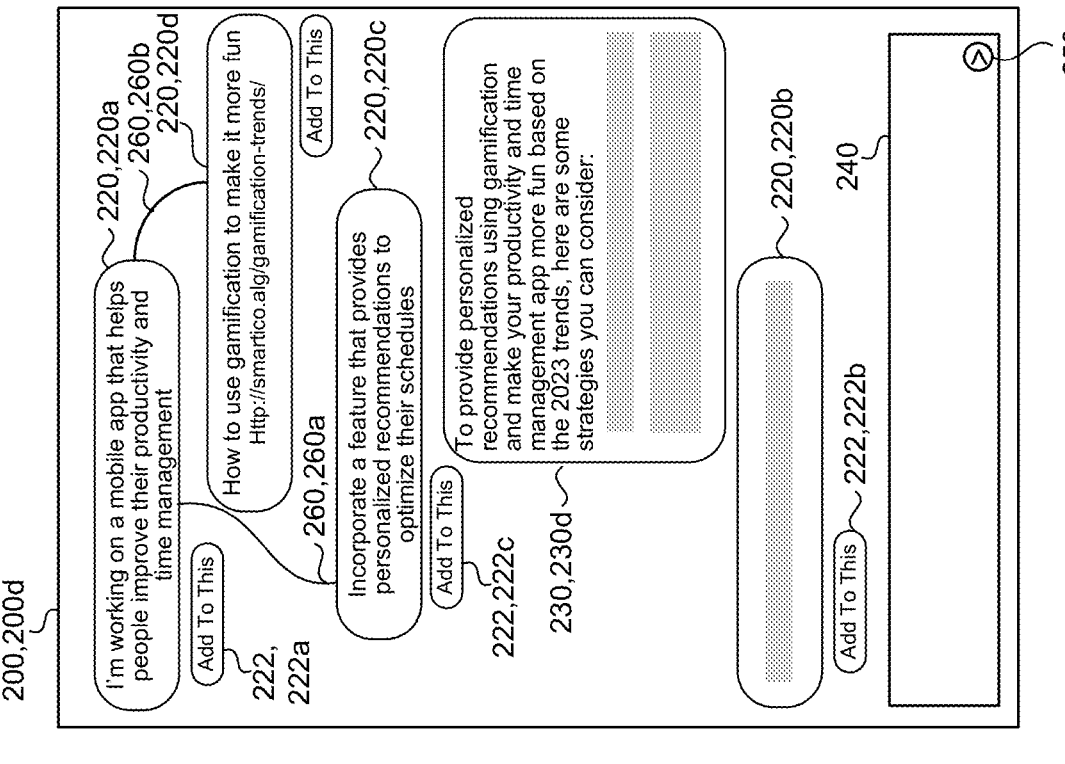

FIG. 2C illustrates another example user interface 200, 200*c* displaying a portion of the chat session 210 between the user 104 and the chatbot 110 that may be presented after the chatbot 110 receives the new entry 220*c* input by the user 104 as an additional entry associated with the entry 220*a*. Based on the additional entry 220*c* associated with the entry 220*a*, the chatbot 110 updates one or more of the corresponding responses 230. In the example shown, the chatbot 110 replaces the response 230*b* with a different or updated response 230*c*. However, the chatbot 110 may update or replace alternative or additional responses 230. As shown, a corresponding response 230 that is updated does not have to be the last response 230 of the plurality of responses 230. In the example shown, the association between the entries 220*a* and 220*c* is shown with a connecting line 260, 260*a*.

FIG. 2D illustrates another example user interface 200, 200*d* displaying a portion of the chat session 210 between the user 104 and the chatbot 110 that may be presented after the chatbot 110 receives, as described above in connection with FIG. 2C, an additional new entry 220*d* input by the user 104 as an additional entry 220 associated with the entry 220*a*. Based on the new entries 220*c* and 220*d* associated with the entry 220*a*, the chatbot 110 again updates one or more of the corresponding responses 230. In the example shown, the chatbot 110 replaces the response 230*c* with yet another different response 230*d*. However, the chatbot 110 may update or replace alternative or additional responses 230. Again, a corresponding response 230 that is updated does not have to be the last response 230 of the plurality of responses 230. In the example shown, the association between the entries 220a and 220d is shown with a connecting line 260, 260b. For multi-party chat sessions (e.g., involving two or more user and a chatbot), the additional new entry 220d associated with the entry 220a may be input by another user other than the user 104.

In the example shown, the another new entry 220d is associated with the entry 220a, however, the new entry 220d could have been associated with a different entry 220a. In some implementations, a new entry 220 may be associated with more than one previous entry 220. Additionally or alternatively, a user interface 200 may be used to delete entries 220, and/or to change associations or linkages between entries 220. Accordingly, disclosed user interfaces 200 enable the user to create any desired arrangement of and linkages between entries 220. Notably, an arrangement of and linkages between entries 220 may be unstructured or may represent a hierarchical association of ideas. That is, the user interfaces 200 enable the user 104 to create a mind map like collection of interconnected thoughts and ideas. The addition, deletion, and arrangement of entries 220 may be performed iteratively over time, thus, freeing the user 104 from having to compose a single entry to clearly and logically outline all their inputs.

In some implementations, the entries 220 may be associated with different input modalities. For example, a first entry 220 may be input using a first input modality (e.g., a text-based input), while a second entry 220, which may or may not be linked to the first entry 220, may be input using a second and potentially different input modality (e.g., speech, audio, an image, or a video).

Figure 2E:
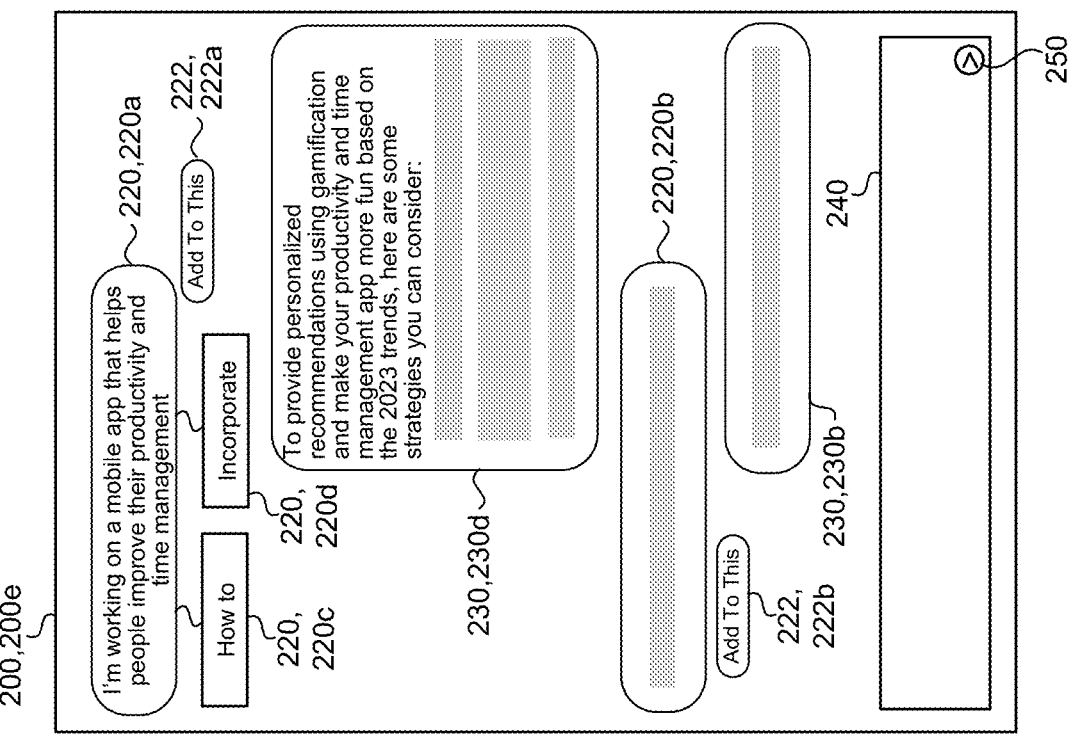

FIG. 2E illustrates another example user interface 200, 200e displaying a portion of the chat session 210 between the user 104 and the chatbot 110 that may be presented following the user interface 200d. In this example, display of the entries 220a, 220c, 220d is collapsed so that the user interface 200e for the chat session 210 has a more compact linear representation. In some implementations, the collapsed entries 220a, 220c, 200d may be expanded by clicking on any of theses entries.

FIG. 3 is a flowchart of an exemplary arrangement of operations for a computer-implemented method 300 of providing conversational user interfaces with multimodal and mind map like interactions. The operations may be performed by data processing hardware 410 (FIG. 4) (e.g., the data processing hardware 12 of the user device 10 or the data processing hardware 72 of the remote computing device 70) based on executing instructions stored on memory hardware 420 (e.g., the memory hardware 14 of the user device 10 or the memory hardware 74 of the remote computing device 70).

At operation 302, the method 300 includes displaying, on a display 480 (e.g., the display 163 of the user device 10) in communication with the data processing hardware 410, a user interface 200 for a chat session 210 between a user 104 and a chatbot 110, the user interface 200 including a plurality of entries 220 input by the user 104 and a plurality of corresponding responses 230 from the chatbot 110. The method 300 includes, at operation 304, receiving, in the user interface 200, a user input indication indicating selection of a particular entry 220 of the plurality of entries 220, the particular entry 220 being other than a last entry 220 of the plurality of entries 220.

At operation 306, the method 300 includes receiving, in the user interface 200, a new entry 220 input by the user 104 for an additional entry 220 associated with the particular entry 200. The method 300 includes, at operation 308, based on the additional entry 220 associated with the particular entry 220, causing the chatbot 110 to update one or more of the plurality of corresponding responses 230 from the chatbot 110.

Figure 4:
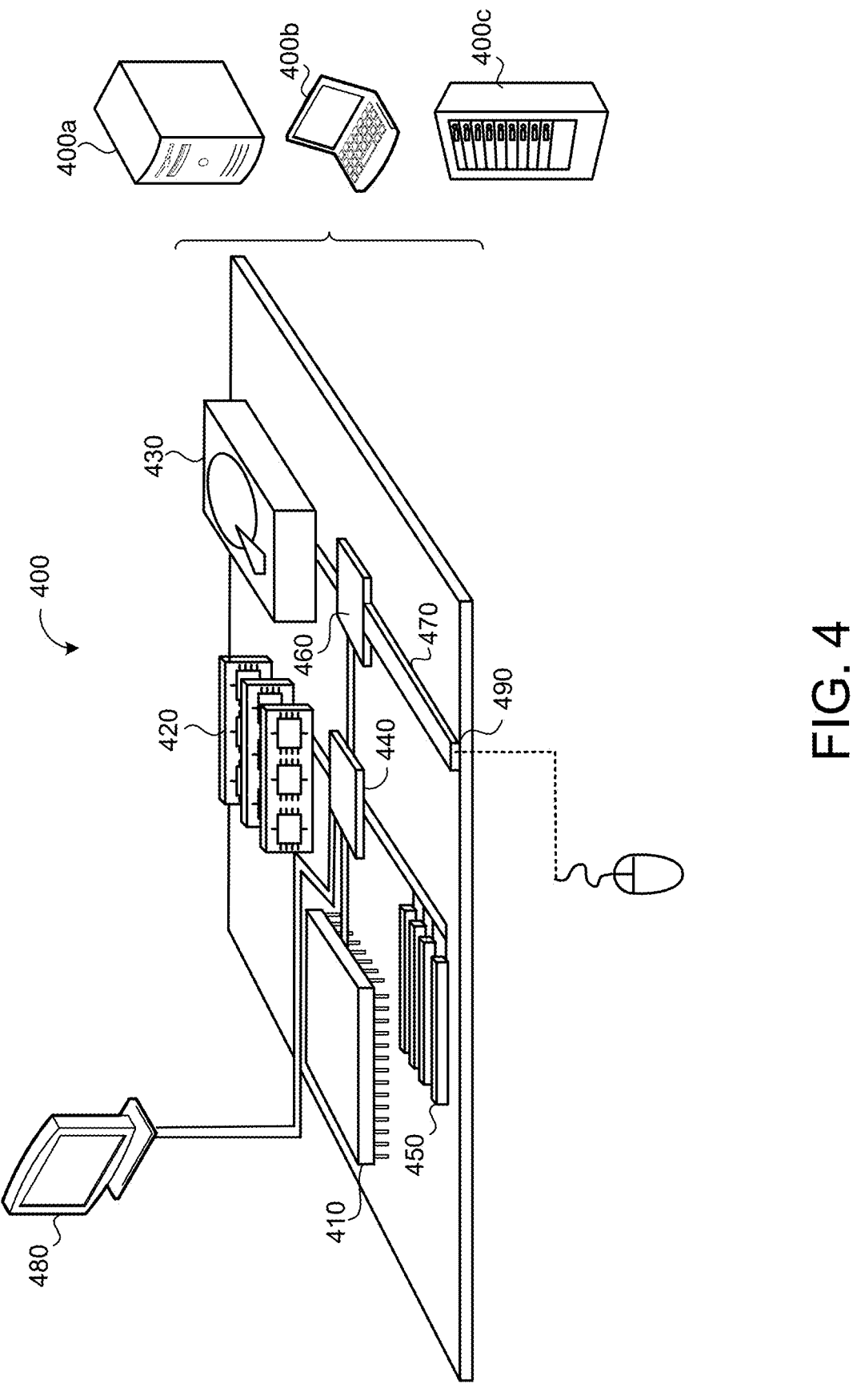
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (i.e., data processing hardware) that can be used to implement the data processing hardware 12 and/or 72, memory 420 (i.e., memory hardware) that can be used to implement the memory hardware 14 and/or 74, a storage device 430 (i.e., memory hardware) that can be used to implement the memory hardware 14 and/or 74, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

displaying, on a display in communication with the data processing hardware, a user interface for a chat session between a user and a chatbot, the user interface comprising a plurality of entries sequentially input by the user and a plurality of corresponding responses from the chatbot, wherein the plurality of entries and the plurality of corresponding response are displayed together in the user interface;

receiving, in the user interface, a user input indication indicating selection of a selected entry of the plurality of entries, the selected entry being other than a last entry of the plurality of entries sequentially input by the user;

in response to the user input indication indicating selection of the selected entry, displaying, in the user interface, an additional text entry box to allow the user to input an additional entry related to the selected entry, the additional text entry box and the selected entry displayed together in the user interface;

receiving, as input by the user into the additional text entry box displayed in the user interface together with the selected entry, the additional entry related to the selected entry; and based on the additional entry related to the selected entry and input by the user into the additional text entry box displayed in the user interface, causing the chatbot to update the response of the plurality of corresponding responses displayed in the user interface that corresponds to the selected entry without updating a last response of the plurality of corresponding responses, the last response of the plurality of corresponding responses displayed in the user interface corresponding to the last entry of the plurality of entries sequentially input by the user, wherein the selected entry, the additional text entry box including the additional entry related to the selected entry, the updated response corresponding to the selected entry, the last entry, and the last response corresponding to the last entry are displayed together in the user interface.

2. The computer-implemented method of claim 1, wherein the response that corresponds to the selected entry updated by the chatbot is other than the last response of the plurality of corresponding responses.

3. The computer-implemented method of claim 1, wherein receiving the additional entry input by the user for the additional entry associated with the selected entry results in a non-linear chat session.

4. The computer-implemented method of claim 1, wherein receiving the additional entry input by the user for the additional entry associated with the selected entry results in an unstructured chat session.

5. The computer-implemented method of claim 1, wherein receiving the additional entry input by the user for the additional entry associated with the selected entry results in a mind map comprising an unstructured collection of interconnected ideas.

6. The computer-implemented method of claim 1, wherein receiving the additional entry input by the user for the additional entry associated with the selected entry associates the additional entry with the selected entry in a hierarchical association of ideas.

7. The computer-implemented method of claim 1, wherein:

the selected entry of the plurality of entries was input by the user using a first input modality; and the additional entry input by the user for the additional entry is input by the user using a second input modality different than the first input modality.

8. The computer-implemented method of claim 7, wherein:

the first input modality comprises one of text or speech; and the second input modality comprises the other one of text or speech.

9. The computer-implemented method of claim 1, wherein the operations further comprise displaying, on the display, a collapsed representation of the selected entry and the additional entry.

10. The computer-implemented method of claim 1, wherein the operations further comprise:

receiving, in the user interface, from a second user associated with the chat session, another user input indication indicating selection of another selected entry of the plurality of entries, the another selected entry being other than the last entry of the plurality of entries sequentially input by the user;

receiving, in the user interface, a second additional entry input by the second user for another additional entry to be associated with the another selected entry;

associating the another additional entry with the another selected entry in the chat session; and based on the another additional entry associated with the another selected entry, causing the chatbot to update one or more of the plurality of corresponding responses from the chatbot without updating the last response of the plurality of corresponding responses.

11. A system comprising:

data processing hardware; and memory hardware in communication with the data processing hardware, the memory hardware storing instructions that when executed on the data processing hardware cause the data processing hardware to perform operations comprising:

displaying, on a display in communication with the data processing hardware, a user interface for a chat session between a user and a chatbot, the user interface comprising a plurality of entries sequentially input by the user and a plurality of corresponding responses from the chatbot, wherein the plurality of entries and the plurality of corresponding response are displayed together in the user interface;

receiving, in the user interface, a user input indication indicating selection of a selected entry of the plurality of entries, the selected entry being other than a last entry of the plurality of entries sequentially input by the user;

in response to the user input indication indicating selection of the selected entry, displaying, in the user interface, an additional text entry box to allow the user to input an additional entry related to the selected entry, the additional text entry box and the selected entry displayed together in the user interface;

receiving, as input by the user into the additional text entry box displayed in the user interface together with the selected entry, the additional entry related to the selected entry; and based on the additional entry related to the selected entry and input by the user into the additional text entry box displayed in the user interface, causing the chatbot to update the response of the plurality of corresponding responses displayed in the user interface that corresponds to the selected entry without updating a last response of the plurality of corresponding responses, the last response of the plurality of corresponding responses displayed in the user interface corresponding to the last entry of the plurality of entries sequentially input by the user, wherein the selected entry, the additional text entry box including the additional entry related to the selected entry, the updated response corresponding to the selected entry, the last entry, and the last response corresponding to the last entry are displayed together in the user interface.

12. The system of claim 11, wherein the response that corresponds to the selected entry updated by the chatbot is other than the last response of the plurality of corresponding responses.

13. The system of claim 11, wherein receiving the additional entry input by the user for the additional entry associated with the selected entry results in a non-linear chat session.

14. The system of claim 11, wherein receiving the additional entry input by the user for the additional entry associated with the selected entry results in an unstructured chat session.

15. The system of claim 11, wherein receiving the additional entry input by the user for the additional entry associated with the selected entry results in a mind map comprising an unstructured collection of interconnected ideas.

16. The system of claim 11, wherein receiving the additional entry input by the user for the additional entry associated with the selected entry associates the additional entry with the selected entry in a hierarchical association of ideas.

17. The system of claim 11, wherein:

the selected entry of the plurality of entries was input by the user using a first input modality; and the additional entry input by the user for the additional entry is input by the user using a second input modality different than the first input modality.

18. The system of claim 17, wherein:

the first input modality comprises one of text or speech; and the second input modality comprises the other one of text or speech.

19. The system of claim 11, wherein the operations further comprise displaying, on the display, a collapsed representation of the selected entry and the additional entry.

20. The system of claim 11, wherein the operations further comprise:

receiving, in the user interface, from a second user associated with the chat session, another user input indication indicating selection of another selected entry of the plurality of entries, the another selected entry being other than the last entry of the plurality of entries sequentially input by the user;

receiving, in the user interface, a second additional entry input by the second user for another additional entry to be associated with the another selected entry;

associating the another additional entry with the another selected entry in the chat session; and based on the another additional entry associated with the another selected entry, causing the chatbot to update one or more of the plurality of corresponding responses from the chatbot without updating the last response of the plurality of corresponding responses.

* * * * *